Patented Feb. 16, 1926.

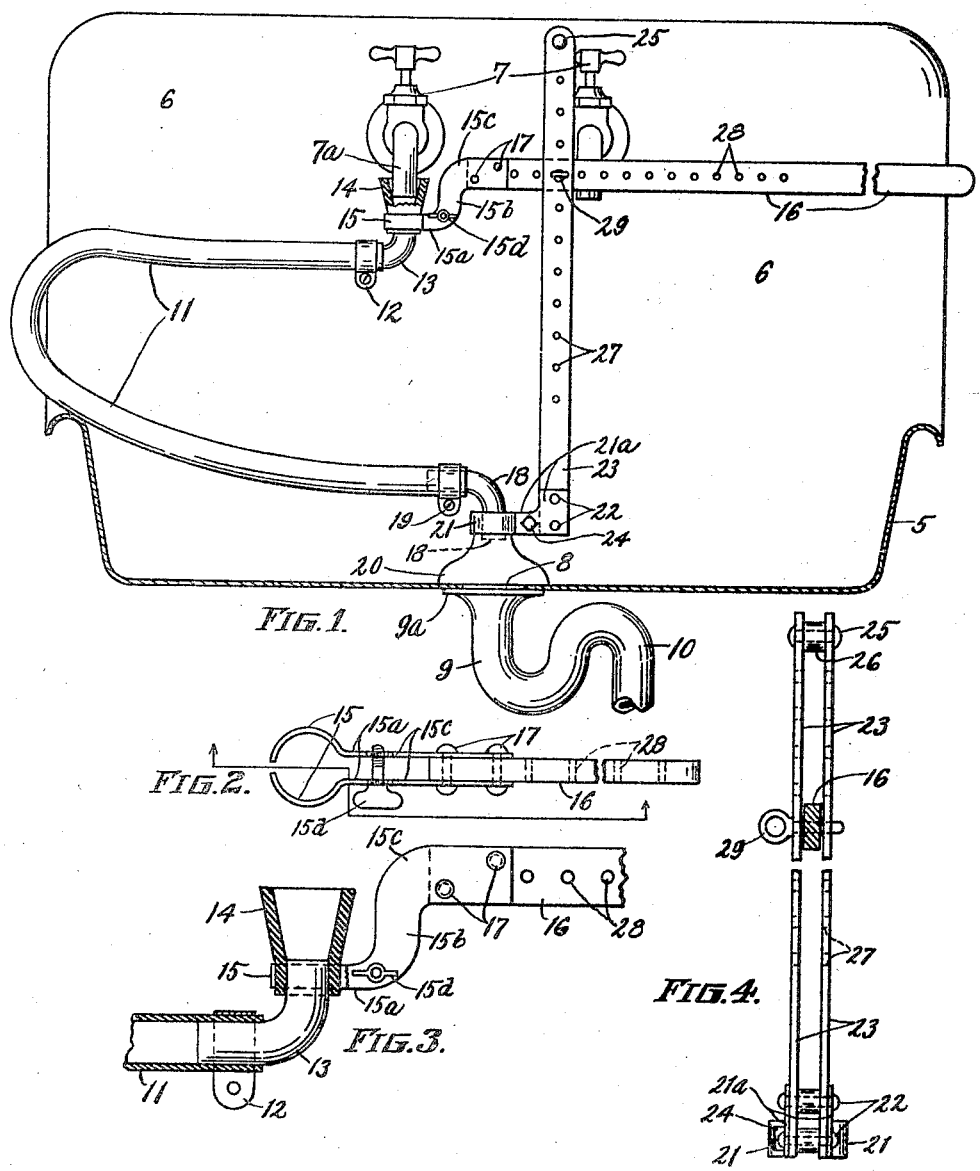

1,573,202

UNITED STATES PATENT OFFICE.

ALBERT O. STENWICK, OF RED WING, MINNESOTA.

SEWER TRAP AND PIPE CLEANING DEVICE.

Application filed May 9, 1925. Serial No. 29,091.

*To all whom it may concern:*

Be it known that I, ALBERT O. STENWICK, a citizen of the United States, residing at Red Wing, in the county of Goodhue and State of Minnesota, have invented certain new and useful Improvements in Sewer Trap and Pipe Cleaning Devices, of which the following is a specification.

My invention relates to a device for clearing out clogged or partly clogged pipes and is particularly useful for opening up obstructed sewer pipes, drain pipes, sewer traps and the like.

The object is to provide a simple, inexpensive and very efficient device particularly adaptable for use in kitchen sinks, bath tubs, home laundries or any other place where water under pressure is available near the opening of the drain pipe or other pipe to be cleaned.

In the accompanying drawing:

Fig. 1 is a front view of my device in operative position in a kitchen sink, the latter being shown in longitudinal vertical section.

Fig. 2 is an enlarged top view of the hand lever of my device.

Fig. 3 is an enlarged partly sectional vertical elevation of the intake end of my device and the attached hand lever.

Fig. 4 is an enlarged elevation of the upright column of my device looking from right to left in Fig. 1.

Referring to the drawing by reference numerals, 5 designates the horizontal basin of a kitchen sink having a wall plate 6 adjacent to the face of which is suitably fixed one or more water faucets 7. 8 in Fig. 1 designates the usual drain aperture in the bottom of the sink and $9^a$ is a flange fixed concentrically thereof and is an integral part of the drain pipe 9 connected to or integral with the sewer trap 10 commonly located directly under the sink (see Fig. 1).

My device comprises flexible tubular means one end connected to one of the faucets 7 and the other end registering with the sink drain opening and covering same. Further adjustable means are operatively connected adjacent the opposite ends of said tubular element and co-operate therewith to send a volume of water under pressure through the clogged pipe as will now be described.

11 is a hose of any suitable flexible material in one end of which is held by a hose clamp 12 one end of a metal pipe L 13, the other end of said L being inserted in the small end of a funnel like member 14 preferably made of soft rubber. The said small end of member 14 is held securely about pipe 13 by two opposite clamp members 15 adjustable toward each other by a thumb screw $15^d$ engaging in the horizontal arms $15^a$ extending one each from the members 15, said arms being offset upwardly as $15^b$ thence horizontally as $15^c$, one arm ($15^c$) at each side of a horizontally disposed lever 16 and secured to it as at 17 by rivets or other suitable means.

In the opposite end of hose 11 is inserted another pipe L 18 held in place by a hose clamp 19, while the other end of the L is inserted in the small or intake end of any suitable well known plumbers' rubber cups 20 which are usually bell shaped as shown and the latter is held in place by clamp members 21 each having a horizontal arm extension $21^a$. Said latter arms $21^a$ are in horizontal spaced relation to each other and their extremities are secured each as at 22 to the lower end of one of a pair of vertical bars 23. 24 is a suitable screw or bolt engaging both arms $21^a$ or adjusting them to clamp the members 21 about the small end of cup 20 and retain it rigidly on the pipe L 18. The bars 23 form a vertically disposed column and their upper ends may be held in fixed relation by a rivet 25 passed through a spacer 26 and said bars comprise preferably each a light metal flat bar both with a row of registering holes 27. The lever 16 likewise has a row of holes 28 and is placed between bars 23 so that any of its holes 28 may be aligned with any pair of holes 27 in bars 23 and a pivot pin 29 may be inserted through the three members 16—23 (see Fig 4).

In the operation of my device and assuming that a sewer trap just below a sink, as 10 and 5 respectively in Fig. 1, is to be cleared of obstruction, the operator first places cup 20 to cover the drain opening 8 and holding column 23 vertically he next adjusts arm 16 to about horizontal position relative to the outlet $7^a$ of a faucet 7 and inserts pin 29 in the nearest available holes 27—28 most readily aligned. Then the funnel like member 14 is pressed upwardly about the faucet outlet $7^a$ by downward pressure on the outer end of lever 16. The latter being pivoted at 29 its short end is pressed upwardly making a water tight contact about the outlet 7ª in member 14 and simultaneously the same downward pressure on lever 16 causes the column 23 to press the resilient rubber cup 20 to press against the bottom of sink 5 about the drain opening 8 leading to trap 10. Holding the lever 16 down with one hand the operator turns on the water full force at the faucet 7 and the water is of course conducted directly to the trap 10 under its full pressure and any obstruction in the latter is forced down to larger sewer pipes and carried away.

It is obvious that the device is equally useful in bath tubs, home laundries or any other place where a drain pipe or sewer trap opening is located near a source of water under pressure.

What I claim is:

1. A pipe cleaning device of the class described comprising a tubular element, a funnel shaped intake member at one end of said tubular element, a bell shaped member of soft material at the discharge end of said tubular element, all said members having a continuous uninterrupted passage, said funnel shaped member adapted to be pressed into frictional contact with the discharge means of a source of liquid under pressure and said bell shaped member adapted to be pressed into communicative position with the exposed end of a pipe to be cleared of obstruction, and means for holding said funnel shaped member and the bell shaped member in operative positions simultaneously.

2. The structure specified in claim 1 in which said means for holding the end members of the tubular element in operative position comprises a vertically disposed column with its lower end detachably secured to the bell shaped member and the tubular element and said column has a row of apertures; a horizontally disposed lever and means at one end thereof for detachably fixing it to the end of the tubular member adjacent its intake end and means for pivotally engaging said lever arm in the column.

3. The structure specified in claim 1 in which said means for holding the end members of the tubular element in operative position comprises a vertically disposed column with its lower end detachably secured to the bell shaped member and the tubular element and said column is provided with a row of apertures; a horizontally disposed lever and means at one end thereof for detachably securing it to the end of the tubular member adjacent its intake end and means for pivotally engaging said lever arm in the column, said lever arm having a row of apertures, a removable pin adapted to be placed selectively in any of the apertures of the column and one of the apertures of the lever arm aligned therewith.

In testimony whereof I affix my signature.

ALBERT O. STENWICK.